Dec. 18, 1934.                J. S. MURRAY                1,984,688
                         METER TESTING ARRANGEMENT
                           Filed Dec. 14, 1929
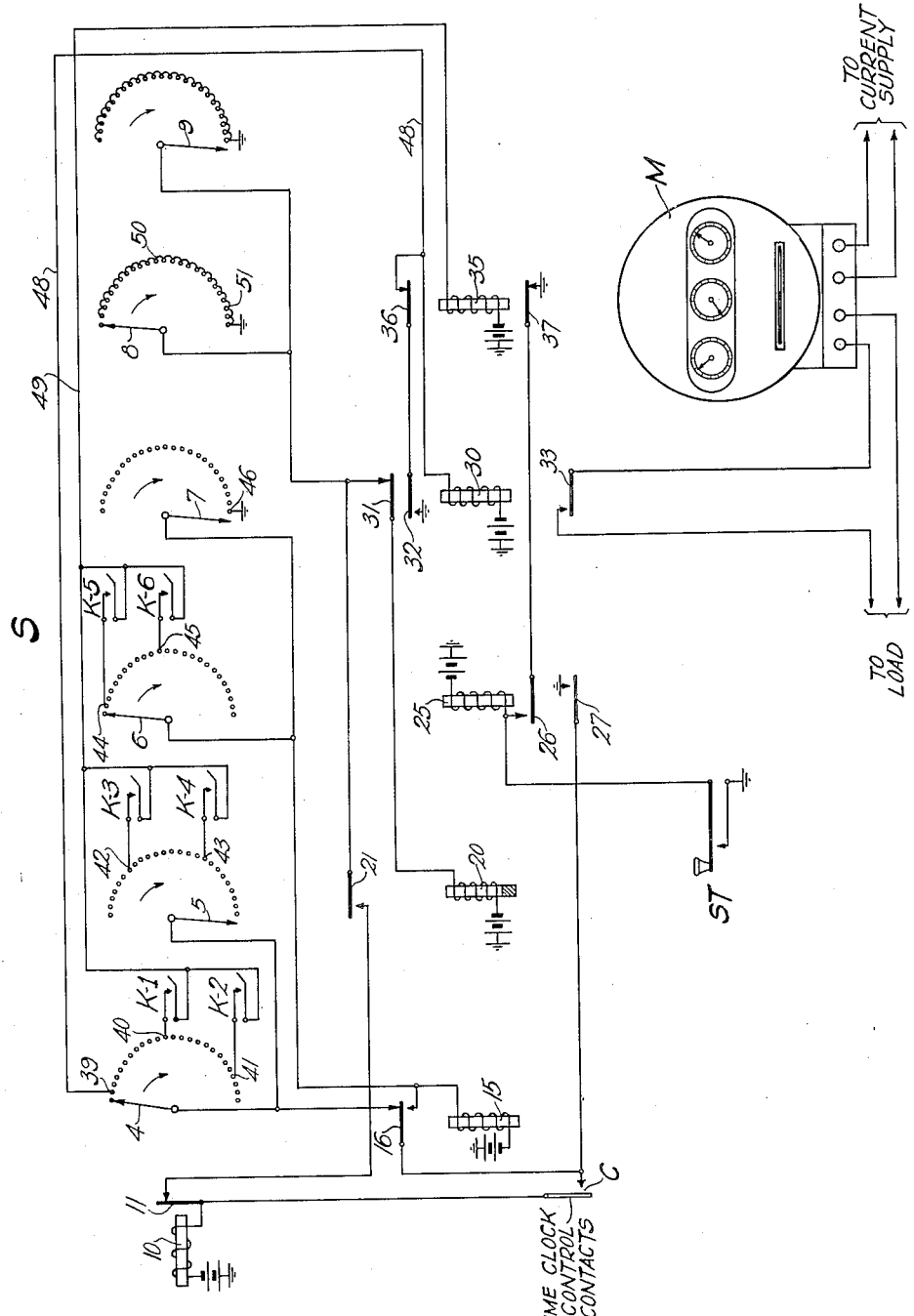
Inventor
James S. Murray
Wm Walter Owen. Atty.

Patented Dec. 18, 1934

1,984,688

UNITED STATES PATENT OFFICE 1,984,688

METER TESTING ARRANGEMENT

James S. Murray, Chicago, Ill., assignor, by mesne assignments, to Associated Electric Laboratories, Inc., Chicago, Ill., a corporation of Delaware Application December 14, 1929, Serial No. 414,021

10 Claims. (Cl. 161—1)

This invention relates in general to testing arrangements, but more particularly to a testing arrangement for checking the operation of an electric meter, and the principal object of the invention is the provision of circuit arrangements and means whereby electric meters may be quickly and accurately tested or calibrated with a minimum amount of equipment and in a reliable manner.

A further object of the invention is the provision of means for automatically testing an electric meter with a given load applied to it for a predetermined time interval, in order to test the accuracy of the reading of the meter.

A further object of the invention is the provision of means for automatically testing an electric meter having a given load applied to it, together with means for providing an adjustable and variable time interval for testing the accuracy of operation of the meter with the given load.

The principal feature of the invention resides in the provision of a progressively movable switch, operated in accordance with a predetermined time interval, together with a plurality of relays for controlling said switch in a manner to test an electric meter.

A further feature of the invention resides in the provision of a number of manually operated keys connected to the bank contacts of the switch in such a manner that the time interval for operating the electric meter may be adjustably varied.

These and other objects and features not specifically pointed out will be apparent in the detailed description, which together with the single sheet of drawing constitutes a preferred embodiment of the invention.

Referring now more particularly to the drawing, the reference character M indicates an electric meter commonly called a watt-meter, which is of a well known construction and usually consists of a casing through which there is visible a number of dials, usually three, which are operated by electric mechanism to indicate a particular reading or value depending on the load or amount of electrical energy consumed during a certain time interval. The standard load which this meter is arranged to measure, for the purpose of testing it, may comprise a motor, lamps, or any other electric energy consuming medium.

The meter testing mechanism comprises a group of relays each having a number of armatures which are attracted to close particular circuits when the relay is energized. The rotary stepping switch S comprises an operating magnet 10 and a number of sets of bank contacts and their associated wipers. These wipers are mounted on a single shaft and are rotated in a forward direction as indicated over their associated bank contacts under control of the magnet 10 each time it becomes deenergized. This type of switch is well known and is similar to that disclosed in Patent No. 1,693,027, issued November 27, 1928, to John Erickson. It will be noted that the wipers of the switch S are arranged so that when one wiper is stepped on to its first bank contact the next wiper will be just leaving its last bank contact. As the capacity of one bank is only twenty-five contacts it will be thus appreciated that the amount is increased to fifty contacts by this method because the alternate pairs of wipers are connected together. Circuit arrangements are also provided whereby this number of contacts can be increased by cutting certain wipers out of the circuit and connecting in another wiper so as to render its associated bank contacts effective.

Connected to each of the first three sets of bank contacts of the switch S are a pair of locking keys K—1, K—2, etc., any one which upon being operated is arranged to stop the switch in that position. Each key corresponds to a particular time interval in accordance with the operation of the switch and corresponds to the time interval during which the electric meter M will be operated and show a reading or calibration.

The time-clock control contacts C shown connected in circuit of the stepping magnet 10 are arranged to close once every second or once every minute, depending on the time interval required to test the meter. These contacts may be controlled by a time-clock pendulum mechanism or any other well-known construction of this type. Each time they are closed the stepping magnet 10 will become energized, and upon the opening of the contact the magnet deenergizes and operates the wipers of the switch S in a forward direction one step. The non-locking start key ST is provided for setting the testing mechanism into operation after the meter M has been connected up.

It may be stated that the battery and ground connections shown separately on the drawing are actually connected to a single battery feed, and are shown as indicated merely for convenience.

A detailed description of the operation of the testing arrangement will now be given, it being first assumed that the meter M is one which is to be tested and which is connected so that two of its terminals connect to the current supply conductors while the other two are connected to an electrical energy consuming load in series with the contacts 33, so as to create an artificial load on the meter M.

The keys connected to the bank contacts of the switch S are each arranged to control the operation of the meter M during ten-second intervals, provided the time-clock contacts C are arranged to be operated or closed once each second. The key K1, therefore, when operated stops the operation of the meter M after ten seconds; key K2 after twenty seconds; K3 after thirty seconds; K4 after forty seconds; K5 after fifty seconds; and key K6 for sixty seconds or one minute. It will thus be seen that the operation of a particular key will control the operation of the meter M for a period corresponding to this operated key. With the meter M connected in the testing circuit, assume that the key K1 is operated. This arranges the circuit of the stepping switch S so it will stop after a ten-second interval, after having been set in operation.

To start the operation of the device, the start key ST is momentarily operated. This completes a circuit extending from ground through the contacts of start key ST, through the winding of relay 25 to battery. Relay 25 upon operating closes its armature 26 onto its front contact and completes a locking circuit for itself extending from ground on the back contact of armature 37, armature 26 and its front contact, through the winding of relay 25 to battery. Accordingly, this relay remains locked in energized position as long as armature 37 remains grounded. As a further result of the energization of relay 25, ground is closed on front contact of armature 27 to the time-control contacts C, and each second when these contacts are closed this ground extends through the contacts C and through the winding of stepping magnet 10 to battery. A branch of this circuit extends to armature 16 and its back contact to the wipers 4 and 5 but without effect at this time. Stepping magnet 10 is accordingly energized at one-second intervals by the contacts C, and upon its first energization it withdraws the armature pawl from the wiper shaft ratchet wheel (not shown). When time contacts C open, stepping magnet 10 deenergizes and upon restoring its armature it advances each of the wipers 4, 5, 6, 7, 8, and 9 one step in a forward direction as indicated. The wipers 5, 7, and 9 will, therefore, be advanced one step further away from their associated bank contacts, while the wipers 4, 6, and 8 will be stepped from their first set of bank contacts which is their normal position onto the second set of bank contacts.

A circuit is now completed by the wiper 4, extending from ground on armature 27 of relay 25, armature 16 and its back contact, wiper 4, bank contact 39 upon which wiper 4 is now resting, conductor 48, and through the winding of relay 30 to battery. Relay 30 upon operating locks itself over a circuit from ground on its front contact and armature 32, armature 36 and its back contact, and then through its winding to battery. This action takes place before the contacts C again close to step the wiper 4, under control of the stepping magnet 10, off of bank contacts 39 and to the next bank contacts. As a further result of the operation of relay 30 it closes its armature 33 onto its front contact, thereby including the meter M in circuit with the artificial load, so that it will now commence to operate its indicators in accordance with the amount of electrical energy consumed by the load. Relay 30 also operates its armature 31 to open a point in the circuit of relay 20 and prevent its operation at this time.

The stepping magnet 10 continues to operate under control of the time-clock contacts C and advances the wipers further over their bank contacts but without effect at this time. When the wiper 4 reaches the bank contact 40, it will have taken ten steps to reach this bank contact and the time-clock contact C will therefore have operated ten times. This corresponds to a ten-second interval for which the testing of the meter M has been set.

With wiper 4 on bank contact 40, a circuit is completed extending from the ground on closed front contact and armature 27, armature 16 and its back contact, wiper 4, bank contact 40, operated contacts of the key K1, conductor 49, through the winding of relay 35 to battery. Accordingly, relay 35 energizes and upon operating its armature 37 from its back contact, it disconnects the ground extending through the locking armature 26 of relay 25. Relay 25 accordingly deenergizes and opens its front contact from its armature 27, thereby opening the circuit through the time-clock contacts C for the stepping relay 10 so that the switch S is now brought to rest. Relay 35 at the back contact of armature 36 opens the locking circuit extending from relay 30 to its locking armature 32 and this relay deenergizes. At the front contact and armature 33 relay 30 opens the circuit extending from the artificial load to the meter M, so that the meter stops operating.

The attendant having first noted the reading of the meter before it was tested, will now make another reading of it after it has been operated for the ten seconds. This will give him an indication of whether the meter is operating satisfactorily when it is measuring the energy consumption of its given load within a predetermined time interval. Before another test can be made, the key K1 must be released and the switch S restored to its normal position again, as will be pointed out later.

With key K2 operated, a twenty-second time interval will elapse before the wiper 4 reaches its bank contact 41 to operate relay 35 and thereby cut off the meter M. When key K3 is operated for a thirty-second time interval, the wiper 4 will make one complete sweep over its bank contacts, while the wiper 5 will be operating in a space away from its bank contacts, and upon the thirtieth consecutive step the wiper 5 will reach its bank contact 42, and complete the circuit through the operated key K3 to the stop relay 35. When a forty-second time interval is desired, the key K4 is operated to connect relay 35 to bank contact 43, so that when wiper 5 reaches it, the switch stops.

It will be remembered that when either one of the keys K1 to K4 were operated, and the wipers 4 or 5 reached the bank contacts to which the operated key was connected, the switch S would automatically come to rest. The switch after having been operated must therefore be restored to its normal position again, and for this purpose the wipers 8 and 9 and their associated bank contacts are provided. If either key K1 or K2 has been operated the wiper 8 will come to resting position on bank contacts 50 or 51, which it will be noted, are all multiply connected with the other contacts to ground. This ground, therefore, extends from the grounded bank contacts through wiper 8, back contact and armature 31 of relay 30, which it will be remembered had its circuit opened at the time relay 35 energized due to the wiper 4 stopping on the bank contacts associated with either key K1 or K2, then through the winding of slow-to-release relay 20 to battery. Relay 20 upon operating at the front contact of armature 21, extends the ground from the grounded bank contacts to the back contact and armature 11 and through the winding of stepping magnet 10 to battery. Each time the wiper 8 encounters a grounded bank contact, stepping magnet 10 energizes and at its armature 11 interrupts its own energizing circuit and upon deenergizing it rotates all of the wipers one step in a forward direction over their bank contacts. This action continues until the wiper 8 reaches its last bank contact and upon stepping off of this bank contact the wiper 9 will encounter its first grounded contact and the stepping magnet 10 will then be operated from the multiple grounded bank contacts of the wiper 9. The switch continues to step until the wiper 9 reaches its last bank contact, and upon stepping off of this contact wiper 8 will reach its first bank contact and as this contact no longer has ground on it the stepping magnet 10 can no longer energize, and accordingly the switch is stopped in its normal position. The circuit of relay 20 is likewise interrupted and it slowly falls back, and at armature 21 opens a further point in the circuit of stepping magnet 10.

Due to the copper slug on the heel end of relay 20 to render it slow to release, relay 20 will remain energized during the intervals that the wipers 8 or 9 are stepping between each set of bank contacts and therefore maintain armature 21 closed during this time.

Assume now that a lapse of fifty seconds is to take place and the indicators on the meter M are to operate for this time interval to indicate the amount of energy drawn by the load. In this event the key K5 is operated. The time-control contacts C will therefore close fifty times to operate the stepping magnet 10 a similar number of times and move the wipers 4, 5, 6, 7, 8, and 9, fifty steps. Wiper 4 will in this instance reach the same position as shown on the drawing, as will the remaining wipers. At the forty-ninth step, however, wiper 7 will have reached bank contact 46 which is grounded, and this completes a circuit from ground on bank contact 46, wiper 7, through the winding of relay 15 to battery. Relay 15 upon energizing closes a locking circuit for itself from its front contact and armature 16 to armature 27 and its grounded front contact, so that when wiper 7 steps off of bank contact 46 the relay will remain energized. At the back contact of armature 16 relay 15 disconnects the wipers 4 and 5 from the circuit. The magnet 10 again operates and wiper 6 now reaches bank contact 44 and at the front contact of armature 16 a branch of the locking circuit of relay 15 extends over wiper 6, bank contacts 44, operated key K5, conductor 49, through the winding of relay 35 to battery. Relay 35 at armature 37 opens the locking circuit of relay 25 which upon falling back restores its armature 27 and stops the stepping magnet 10 from further operating the switch. At armature 36 relay 35 interrupts the locking circuit of relay 30, which at armature 33 disconnects the meter M. Relay 30 at armature 31 closes the circuit of slow-acting relay 20 from the second bank contact of wiper 8 which is grounded, so that relay 20 at its front contacts and armature 21 closes the automatic stepping circuit for stepping magnet 10 from the grounded bank contact over which wiper 8 is rotating, and until the wiper reaches its first bank contact which is its normal resting position. As a further result of the deenergization of relay 25, it removes ground from its front contact and armature 27 thereby opening the locking circuit of relay 15 which thereupon restores its armatures. When the wiper 8 reaches its normal position, relay 20 deenergizes and the mechanism is again in normal position. The meter M has advanced its indicator during this fifty seconds time interval to indicate the amount of energy consumed by the load, and this reading of the meter will inform the attendant whether the meter is up to its standard operation or not.

When the key K6 is operated, the switch will be rotated for a period of sixty seconds or one minute, and the wipers will come to rest on the bank contact 45 and the same sequence of operations will take place in the circuit as when key K5 was operated.

If at any time the attendant should neglect to restore an operated key before or during the time the switch is automatically restored to normal, no false operation of the mechanism will result because relay 25 is restored and ground from its armature 27 is no longer extended to armature 16 and then the wipers.

From the foregoing it will be seen that a novel type of meter testing mechanism has been devised which comprises a minimum amount of equipment and which accurately starts and stops a meter device during a predetermined adjustable lapse of time under a given load, so that the operativeness of the meter device may be calibrated.

Although the invention has been illustrated in connection with an energy measuring device or watt-meter, it will be appreciated that any other device operating during a predetermined lapse of time may be tested by it, and it is, therefore, not desired to limit the invention to the exact structure shown but only within the scope of the appended claims.

What is claimed is:

1. In a timing mechanism for closing a circuit connection during a period of time, a step-by-step rotary switch, periodically operated time contacts for controlling the operation of said rotary switch, means for starting the operation of said switch and continuing it under control of said time contacts, means responsive to the operation of said rotary switch for closing the circuit connection, variably operated means associated with the bank contacts of said switch, each of said means corresponding to a predetermined interval of time, and means responsive to the operation of one of said variable operated means for stopping said switch and disconnecting said circuit connection.

2. In a timing mechanism for closing a circuit during a period of time, a step-by-step rotary switch, periodically operated time contacts for controlling the operation of said rotary switch, means for starting the operation of said switch and continuing it under control of said time contacts, means responsive to the operation of said rotary switch for closing said circuit, manually operated keys connected to the bank contacts of said switch, each corresponding to a predetermined interval of time, means responsive to the operation of one of said keys for stopping said switch and for opening the circuit and means controlled by said last means for automatically restoring said switch to its normal position independent of said time contacts.

3. In a time controlling mechanism for closing a circuit during a period of time, a step-by-step rotary switch having a plurality of bank contacts, time control contacts periodically operated to step said switch over its bank contacts, relays for controlling said mechanism, means for operating one of said relays to connect said time contacts to operate said stepping switch and operate another of said relays to close said circuit, a plurality of manually operated keys connected to said bank contacts corresponding to predetermined time intervals during the operation of said switch, means responsive to the operation of one of said keys in accordance with a predetermined time interval for stopping the operation of said switch and disconnecting said circuit, and means controlled by said relays for automatically restoring said stepping switch to normal position.

4. In a timing mechanism for closing a circuit during a period of time, a rotary step-by-step switch having a plurality of stop positions, time controlled contacts operated in accordance with a particular time interval to step said switch, manually operated keys connected to each of said stop positions on said switch, said stop positions each corresponding to a predetermined interval of time, means for starting the operation of said stepping switch and placing it under control of said time contacts and at the same time close said circuit and means responsive to the operation of one of said keys for stopping said switch in the position corresponding to said operated key and for opening the circuit.

5. In a timing mechanism for closing a circuit during a period of time, a rotary step-by-step switch having a plurality of stop positions, time controlled contacts operated in accordance with a particular time interval to step said switch, manually operated keys connected to each of said stop positions on said switch, said stop positions corresponding to predetermined intervals of time, means for starting the operation of said stepping switch and placing it under control of said time contacts and at the same time closing said circuit, means responsive to the operation of one of said keys for stopping said switch in the positon corresponding to said operated key, means responsive to the stopping of said switch for opening said circuit, and means controlled by said last means for automatically restoring said stepping switch to normal position each time after having been operated.

6. In a time controlling arrangement for closing a circuit during a time interval, a step-by-step rotary switch, a plurality of stop positions for said switch, each corresponding to a particular time interval during the operation of the switch, means for operating said switch and at the same time connecting up said circuit, and means responsive to said switch reaching an operated one of its stop positions for disconnecting said circuit and at the same time reoperating the switch to restore it to its normal position.

7. In a timing arrangement for closing a circuit for a time interval, a rotary switch operated in a step-by-step manner under control of recurring time intervals, means for starting the operation of said switch, means for stopping said switch after a predetermined time interval, means after said switch has stopped for removing it from control of said recurring time intervals and for operating it in a different manner to restore it to its normal position, and means responsive to the initial operation of said switch for closing the circuit and responsive to the predetermined time interval during the operation and the stopping of the switch for opening the circuit.

8. In a time controlling arrangement for closing a circuit, a rotary progressively operated switch having wipers and bank contacts engaged thereby, said switch controlled by means of recurring time periods to step its wipers over the bank contacts, means for starting the operation of said switch, variable means connected to said bank contacts for stopping the operation of the switch after any predetermined time interval, means after said switch has operated and encountered one of its stopping positions for disconnecting it from under control of said recurring time periods, and for controlling it in an automatic manner to continue its operation to step the wipers to their normal position, and means controlled by the operation of said switch during the predetermined time interval for closing the circuit.

9. In a timing mechanism for controlling a circuit during an interval of time, a progressively movable switch having sets of bank contacts, means for moving said switch over its contacts at a predetermined speed, means associated with certain of said bank contacts operable for stopping the switch thereon, each contact position having such means corresponding to a different lapse of time during the operation of said switch, means responsive to the operation of said switch for closing the circuit, and relay means controlled by the movement of the switch onto a contact having an operated stopping means for opening the circuit.

10. In a timing mechanism for closing a circuit for a time interval, a movable switch having a set of bank contacts, means for moving said switch over its bank contacts at a predetermined rate of speed, manually operated stopping means connected to certain of said bank contacts, each stopping means corresponding to a different lapse of time in the operation of said switch, relay means for starting the operation of said switch and other relay means for closing said circuit, and circuit connections extending between said other relay means and any of said operated stopping means for operating said other relay means to open said circuit after a lapse of time corresponding to the operated stopping means.

JAMES S. MURRAY.